(12) United States Patent
Korosec et al.

(10) Patent No.: US 8,275,706 B2
(45) Date of Patent: *Sep. 25, 2012

(54) METHOD AND SYSTEM FOR PROCESSING TRANSFER REQUESTS

(75) Inventors: Jason Alexander Korosec, San Jose, CA (US); Osama Mostafa Bedier, San Jose, CA (US); Damon Charles Hougland, San Jose, CA (US)

(73) Assignee: Ebay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/283,210

(22) Filed: Oct. 27, 2011

(65) Prior Publication Data

US 2012/0041873 A1    Feb. 16, 2012

Related U.S. Application Data

(63) Continuation of application No. 12/129,553, filed on May 29, 2008, now Pat. No. 8,069,114.

(51) Int. Cl.
*G06Q 40/00* (2006.01)
(52) U.S. Cl. ........................................................ 705/39
(58) Field of Classification Search ...................... 705/39
See application file for complete search history.

(56) References Cited

U.S. PATENT DOCUMENTS

| | | | |
|---|---|---|---|
| 6,487,542 B2 * | 11/2002 | Ebata et al. ..................... | 705/69 |
| 7,089,208 B1 * | 8/2006 | Levchin et al. ................. | 705/39 |
| 7,103,571 B2 * | 9/2006 | Shigemi et al. ................. | 705/39 |
| 7,104,443 B1 * | 9/2006 | Paul et al. ....................... | 235/380 |
| 7,131,578 B2 * | 11/2006 | Paschini et al. ................ | 235/379 |
| 7,181,432 B2 * | 2/2007 | Wells et al. ..................... | 705/64 |
| 7,191,151 B1 * | 3/2007 | Nosek ............................. | 705/39 |
| 7,356,507 B2 * | 4/2008 | Bezos et al. .................... | 705/40 |
| 7,533,064 B1 * | 5/2009 | Boesch ........................... | 705/67 |
| 7,536,336 B1 * | 5/2009 | Guinan ........................... | 705/37 |
| 2006/0064376 A1 * | 3/2006 | Ukigawa et al. ............... | 705/39 |
| 2007/0255320 A1 * | 11/2007 | Inman et al. .................... | 607/2 |
| 2007/0255620 A1 | 11/2007 | Tumminaro et al. | |
| 2007/0255653 A1 * | 11/2007 | Tumminaro et al. ........... | 705/39 |

* cited by examiner

*Primary Examiner* — Lindsay M. Maguire
(74) *Attorney, Agent, or Firm* — Haynes and Boone, LLP

(57) ABSTRACT

Methods and system for processing transfer requests are described. In one embodiment, a value transfer request may be received from a value provider through a network. The value transfer request may include a value amount to be provided from a source user to a target user. A settlement account of the value provider may be reduced by the value amount. A target account of the target user may be increased by the value amount.

24 Claims, 9 Drawing Sheets

METHOD AND SYSTEM FOR PROCESSING TRANSFER REQUESTS

This patent application is a continuation of U.S. patent application Ser. No. 12/129,553 filed on May 29, 2008 and entitled METHOD AND SYSTEM FOR PROCESSING TRANSFER REQUESTS, the entire content of which is hereby incorporated by reference.

BACKGROUND

A user of a value provider (e.g., a bank) may typically transfer value (e.g., currency) between different user accounts of the user (e.g., a savings account and a checking account) with relative ease. Value may be transferred to a different user through checks, hard currency or the like.

BRIEF DESCRIPTION OF THE DRAWINGS

Some embodiments are illustrated by way of example and not limitation in the figures of the accompanying drawings in which.

DETAILED DESCRIPTION

Example methods and systems for processing transfer requests are described. In the following description, for purposes of explanation, numerous specific details are set forth in order to provide a thorough understanding of example embodiments. It will be evident, however, to one skilled in the art that embodiments of the present invention may be practiced without these specific details.

In an example embodiment, a transfer request may be received from a value provider through a network. The transfer request may include a value transfer amount to be for a value amount to be transferred from a source user to a target user. A settlement account associated with the value provider may be reduced by the value amount. A target account of the target user may be increased by the value amount.

In an example embodiment, a transaction request to transfer a value amount from a source user to a target user may be received. A request to transfer the value amount from a settlement account to the target user may be provided to a payment processor. A source account of the source user may be decreased by the value amount. The settlement account may be funded by at least a portion of the value amount.

Figure 1:
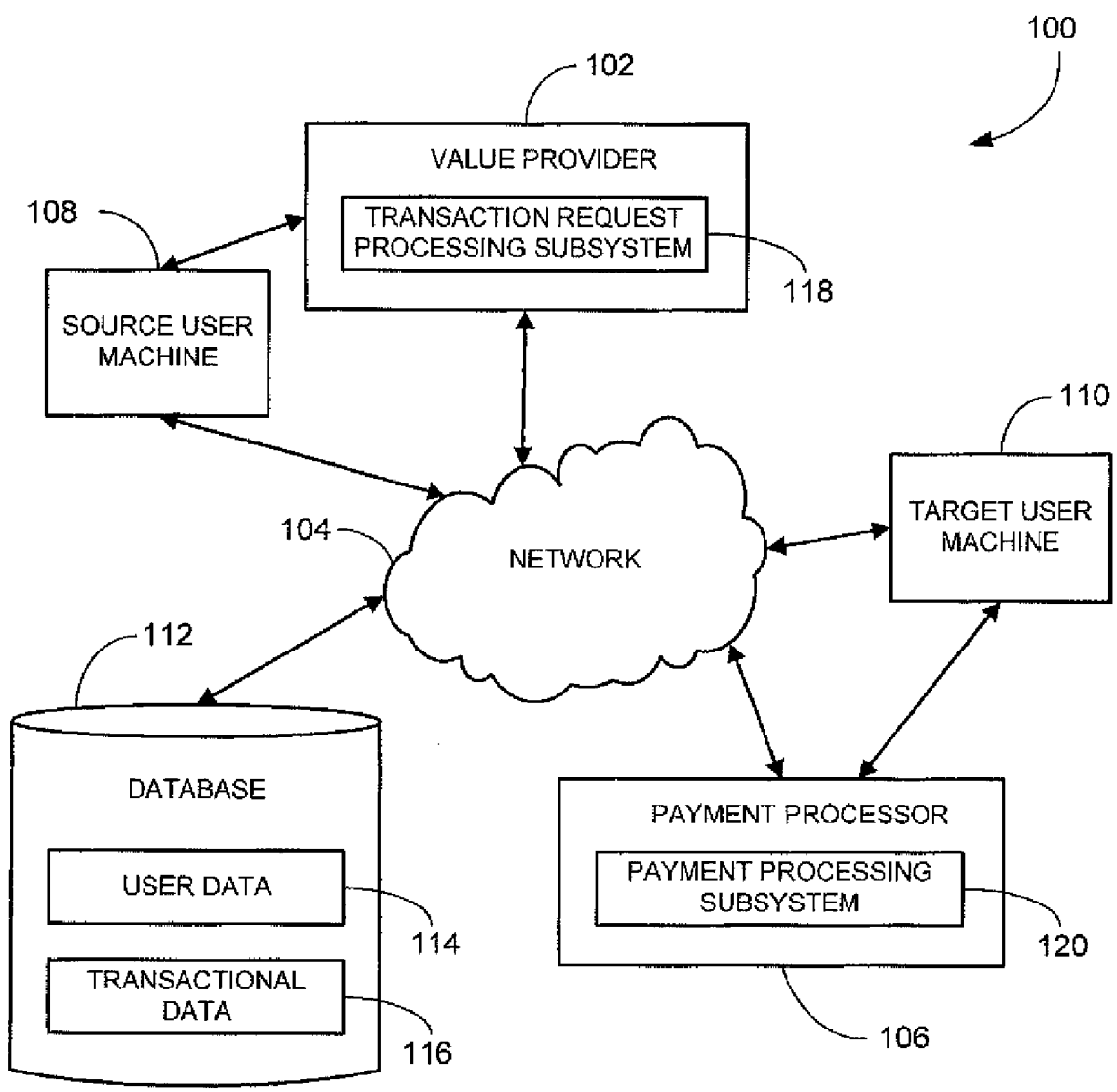
FIG. 1 is a block diagram of a system, according to example embodiments.

FIG. 1 illustrates an example system 100 in which a value provider 102 may be in communication with a payment processor 106 over a network 104. The value provider 102 may be an entity that retains and/or tracks values on behalf of a user. The values may include real currency, virtual currency, alternative currencies, points, credits, miles, precious metals, minutes, or the like. Examples of value providers 102 include banks, gaming systems (e.g., SECOND LIFE), travel companies (e.g., AMERICAN AIRLINES), or the like.

The payment processor 106 may enable a source user of the value provider 102 to transfer a value amount to a target user that, in one embodiment, does not have an account with the value provider 102. The payment processor 106 may include PAYPAL by eBay, Inc. of San Jose, Calif., GOOGLE PAYMENTS by Google Inc. of Mountain View, Calif., or the like.

The source user may operate a source user machine 108 to communicate with the value provider 102 or may communicate directly with the value provider 102 without using the source user machine 108 (e.g., by requesting an in-person transfer of value). A target user may operate a target user machine 110 to, in one embodiment, establish a target account with the payment processor 106. Examples of the source user machine 108 and the target user machine 110 include a banking terminal (e.g., a credit card machine), a set-top box (STB), a receiver card, a mobile telephone, a personal digital assistant (PDA), a display device, a portable gaming unit, and a computing system. Other devices may also be used.

In an example embodiment, the target user may not have an account with the value provider 102 to receive a value amount from the source user. The source user may not have an account with the payment processor 106 and, in one embodiment, may not know that the value amount being transferred to the target user in part by use of the payment processor 106.

The network 104 over which the value provider 102, the payment processor 106, the source user machine 108, and/or the target user machine 110 may be in communication include a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

The value provider 102 and/or the payment processor 106 may also be in communication with a database 112. The value provider 102 and the payment processor 106 may each have separate databases 112 or share the database 112.

The database 112 may include user data 114 and/or transactional data 116. The user data 114 may include information regarding users of the value provider 102 and/or the payment processor 106. The transactional data 116 may include information regarding various transactions. For example, the transfer of a value amount from a source user to a target user may be stored as the transactional data 116.

Figure 2:
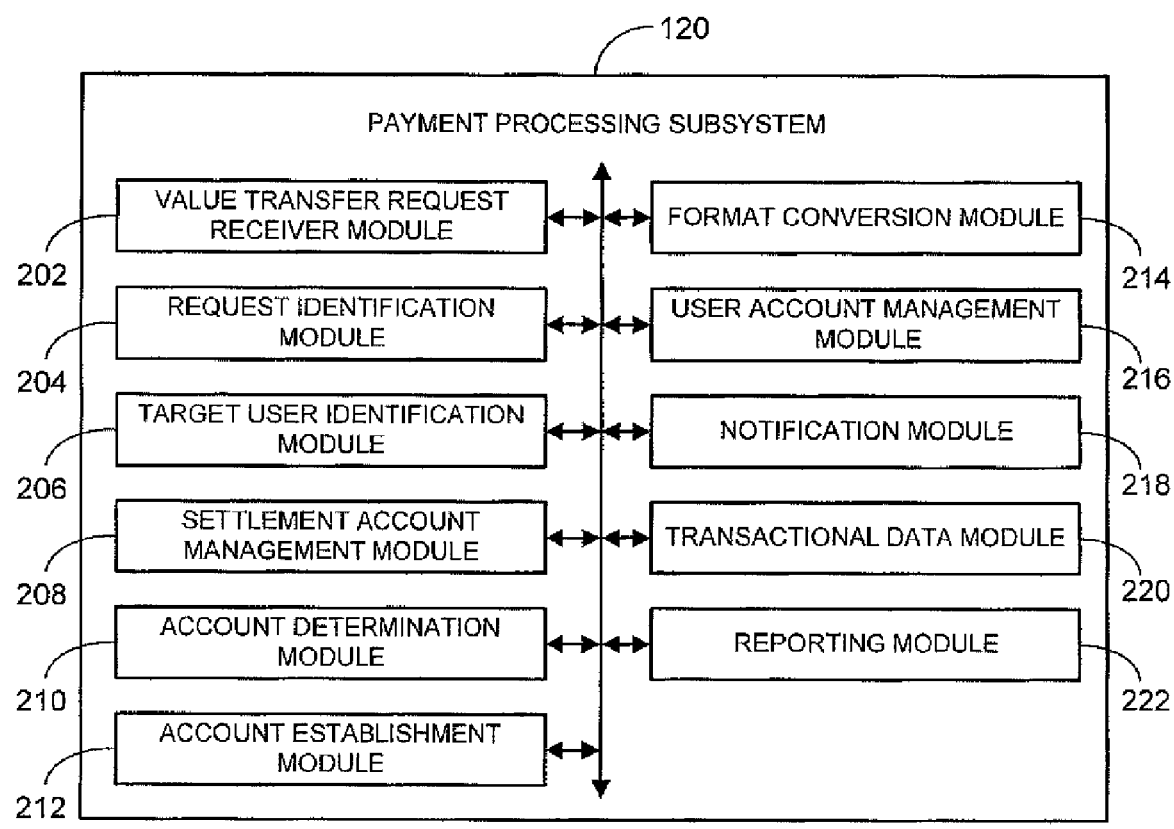
FIG. 2 is a block diagram of an example payment processing subsystem that may be deployed within the system of FIG. 1 according to an example embodiment.

FIG. 2 illustrates an example payment processing subsystem 120 that may be deployed in the payment processor 106 of the system 100 (see FIG. 1) or otherwise deployed in another system. The payment processing subsystem 120 may include a value transfer request receiver module 202, a request identification module 204, a target user identification module 206, a settlement account management module 208, an account determination module 210, an account establishment module 212, a format conversion module 214, a user account management module 216, a notification module 218, a transactional data module 220, and/or a reporting module 222. Other modules may also be included.

The value transfer request receiver module 202 receives a value transfer request from the value provider 102 through the network 104. The value transfer request may include a value amount to be provided from a source user to a target user. The value transfer request may include the value amount and/or the target user identifier associated with the target user.

The request identification module 204 identifies that the value transfer request was received from the value provider 102.

The target user identification module 206 identifies the target user based on a target user identifier. The target user identifier may include, by way of example, an e-mail address, a telephone number, a drivers license number, a national identification number, a license plate, or a token. However, other target user identifiers may also be used.

The settlement account management module 208 reduces a settlement account associated with the value provider 102 by the value amount, reduces the settlement account associated with the value provider 102 by a transaction fee, and/or credits the settlement account associated with the value provider 102 based on establishment of the target account. The settlement account may be in a same currency format as the value amount or in a different currency format.

The account determination module 210 determines whether the target user has a target account with the payment processor 106.

The account establishment module 212 requests user data from the target user based on a determination that the target user does not have a target account with the payment processor 106, receives response data from the target user, and establishes the target account with the payment processor 106 based on the response data.

The format conversion module 214 converts the value amount from a source currency format to a target currency format. The currency format may include a traditional measure of value (e.g., real currency) and a non-traditional measure of value (e.g., virtual currency).

The user account management module 216 increases a target account of the target user by the value amount. The increase of the target account may be based on the target user having the target account with the payment processor 106. In an example embodiment, the target account may be increased by the value amount in an original currency format or a target currency format.

The notification module 218 notifies the target user of the increase in a balance of the target account (e.g., through the target user identifier).

The transactional data module 220 stores the transactional data 116 based on the reduction (e.g., of a balance) of the settlement account and the increase (e.g., in a balance) of the target account.

The reporting module 222 provides a settlement report to the value provider 102. The settlement report may include information regarding the reduction of the settlement account by the value amount and the increase of the target account by the value amount.

Figure 3:
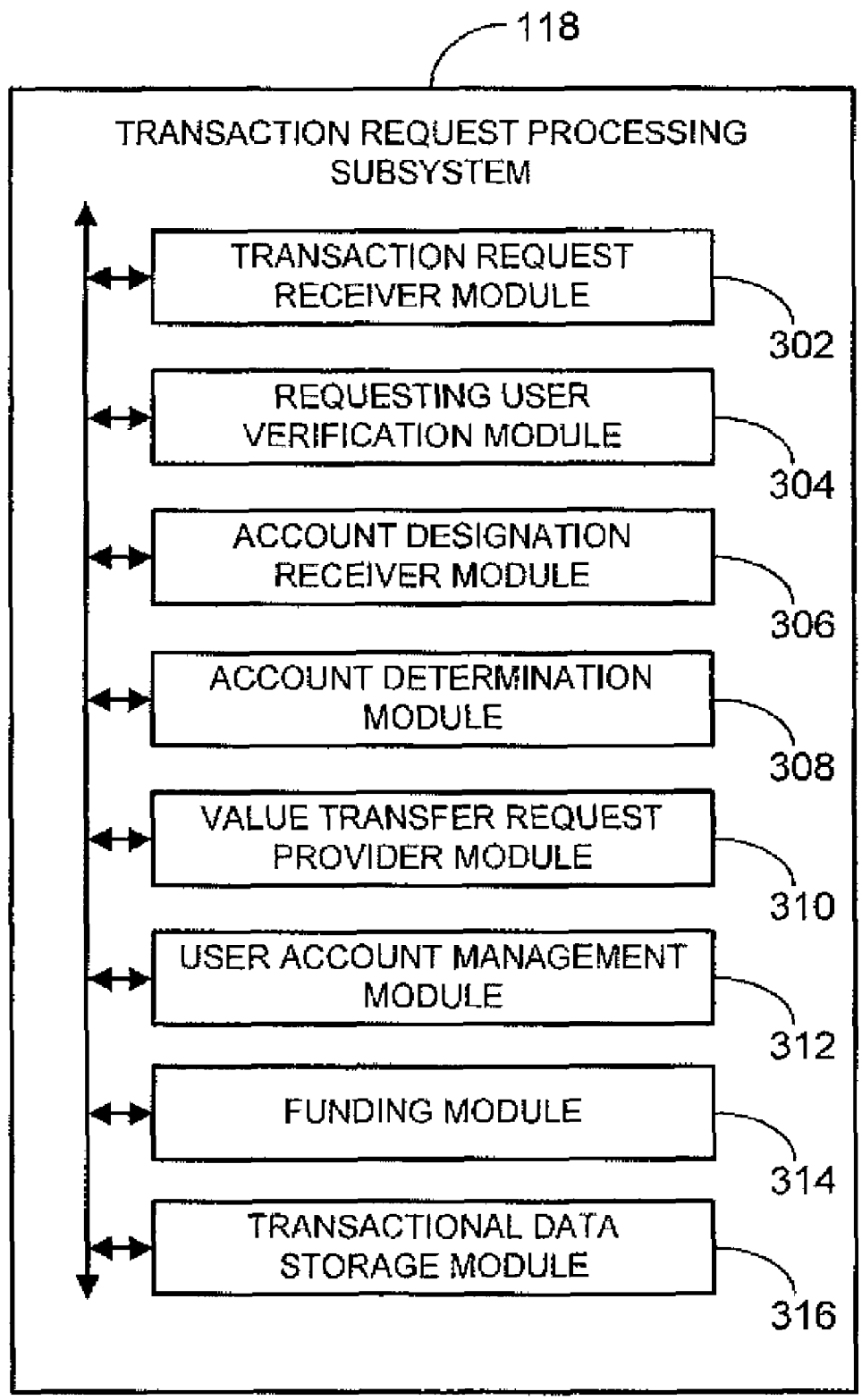
FIG. 3 is a block diagram of an example transaction request processing subsystem that may be deployed within the system of FIG. 1 according to an example embodiment.

FIG. 3 illustrates an example transaction request processing subsystem 118 that may be deployed in the value provider 102 of the system 100 (see FIG. 1) or otherwise deployed in another system. The transaction request processing subsystem 118 may include a transaction request receiver module 302, a requesting user verification module 304, an account designation receiver module 306, an account determination module 308, a value transfer request provider module 310, a user account management module 312, a funding module 314, and/or transactional data storage module 316. Other modules may also be included.

The transaction request receiver module 302 receives a transaction request to transfer a value amount from a source user to a target user. The transaction request may be received from a target user or a requesting user. The transaction request may include the value amount and identification of the target user. The value amount may include real currency, virtual currency, points, credits, miles, precious metals, minutes, or the like.

The requesting user verification module 304 verifies that the requesting user is authorized to provide the transaction request. The account designation receiver module 306 receives a designation of the source account for the transaction request.

The account determination module 308 determines whether the target user has a target account with the value provider 102.

The value transfer request provider module 310 requests the payment processor 106 to transfer the value amount from a settlement account to the target user. The request may be initiated based on the target user not having an account with the value provider 102.

Figure 4:
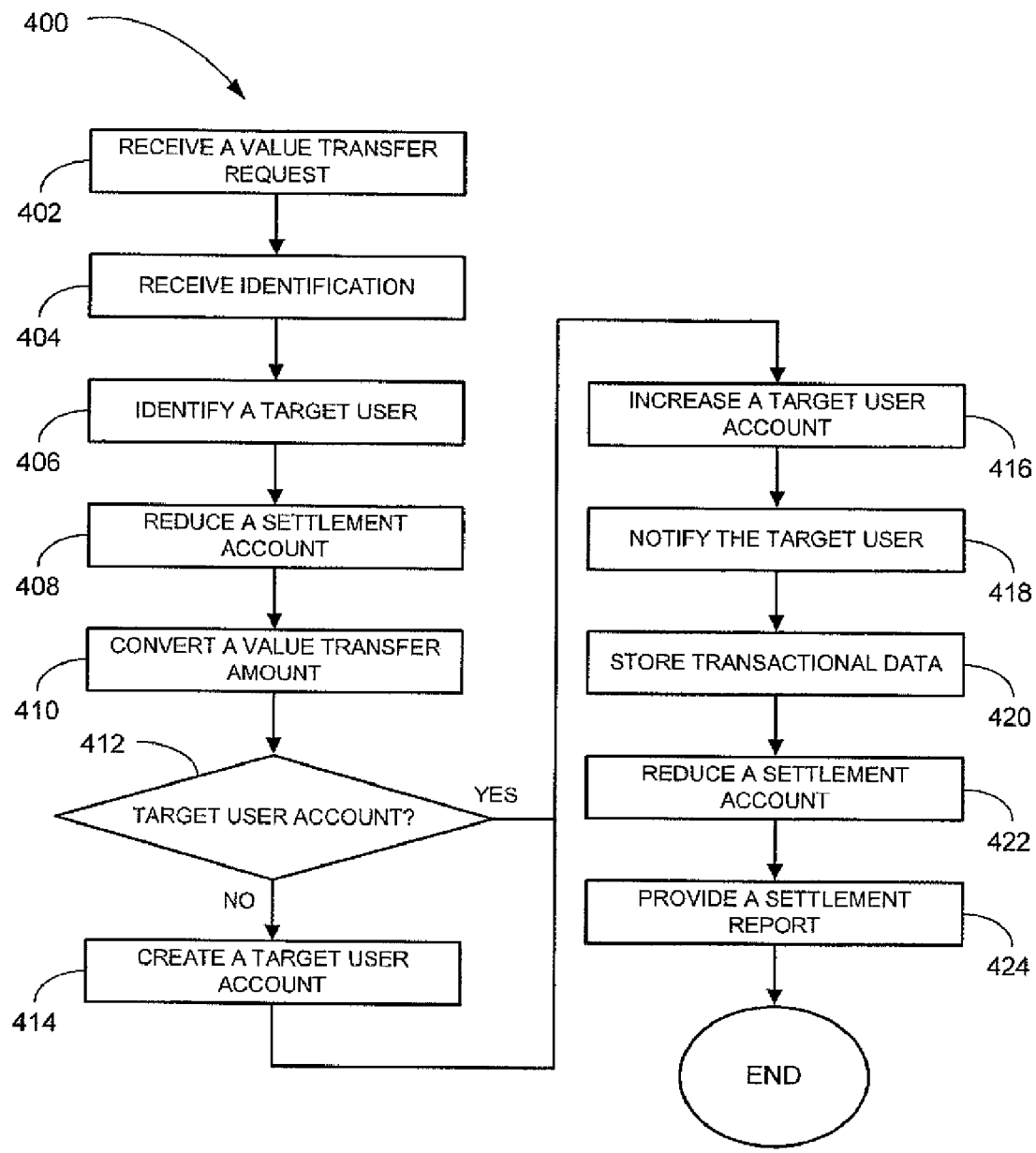
FIG. 4 is an example flowchart illustrating a method for payment processing according to example embodiments.

The user account management module 312 decreases a source account of the source user at the value provider 102 by the value amount and/or a transfer fee. The funding module 314 funds the settlement account by at least a portion of the value amount The transactional data storage module 316 stores transactional data based on the value transfer request and the decrease of the source account FIG. 4 illustrates a method 400 for payment processing according to an example embodiment. The method 400 may be performed by the payment processor 106 of the system 100 (see FIG. 1) or otherwise performed.

At block 402, a value transfer request is received from the value provider 102 through the network 104. The value transfer request may include a value transfer amount to be provided from a source user to a target user and/or the target user identifier associated with the target user.

Identification that the value transfer request was received from the value provider 102 may be made at block 404.

The target user may be identified based on a target user identifier at block 406. Examples of a target user identifier include an e-mail address, a telephone number, a drivers license number, a national identification number, a license plate, a token, or the like.

A settlement account associated with the value provider 102 is reduced by the value amount at block 408. The value amount may be in the same format as may be indicated in the value transfer request or may be in a different format (e.g., a real currency format, a virtual currency format, or a different type of currency). The value amount may be converted from a source currency format to a target currency format at block 410.

At decision block 412, a determination may be made as to whether the target user has a target account with the payment processor 106. If a determination is made that the target user does not have a target account with the payment processor 106, a target account may be created at block 414. If a determination is made that the target user has a target account at decision block 412 or upon completion of the operations at block 414, a target account of the target user is increased by the value amount at block 416. The target account may be increased by the value amount in an original currency format or a target currency format.

The target user may be notified of the increasing of the target account at block 418. The target user may be notified through the target user identifier or may be otherwise notified.

Transactional data may be stored based on the reducing of the settlement account and/or the increasing of the target account at block 420.

The settlement account associated with the value provider 102 may be reduced by a transaction fee at block 422.

A settlement report may be provided to the value provider 102 at block 424. The settlement report may include information regarding reduction of the settlement account by the value amount and/or the increase of the target account by the value amount.

Figure 5:
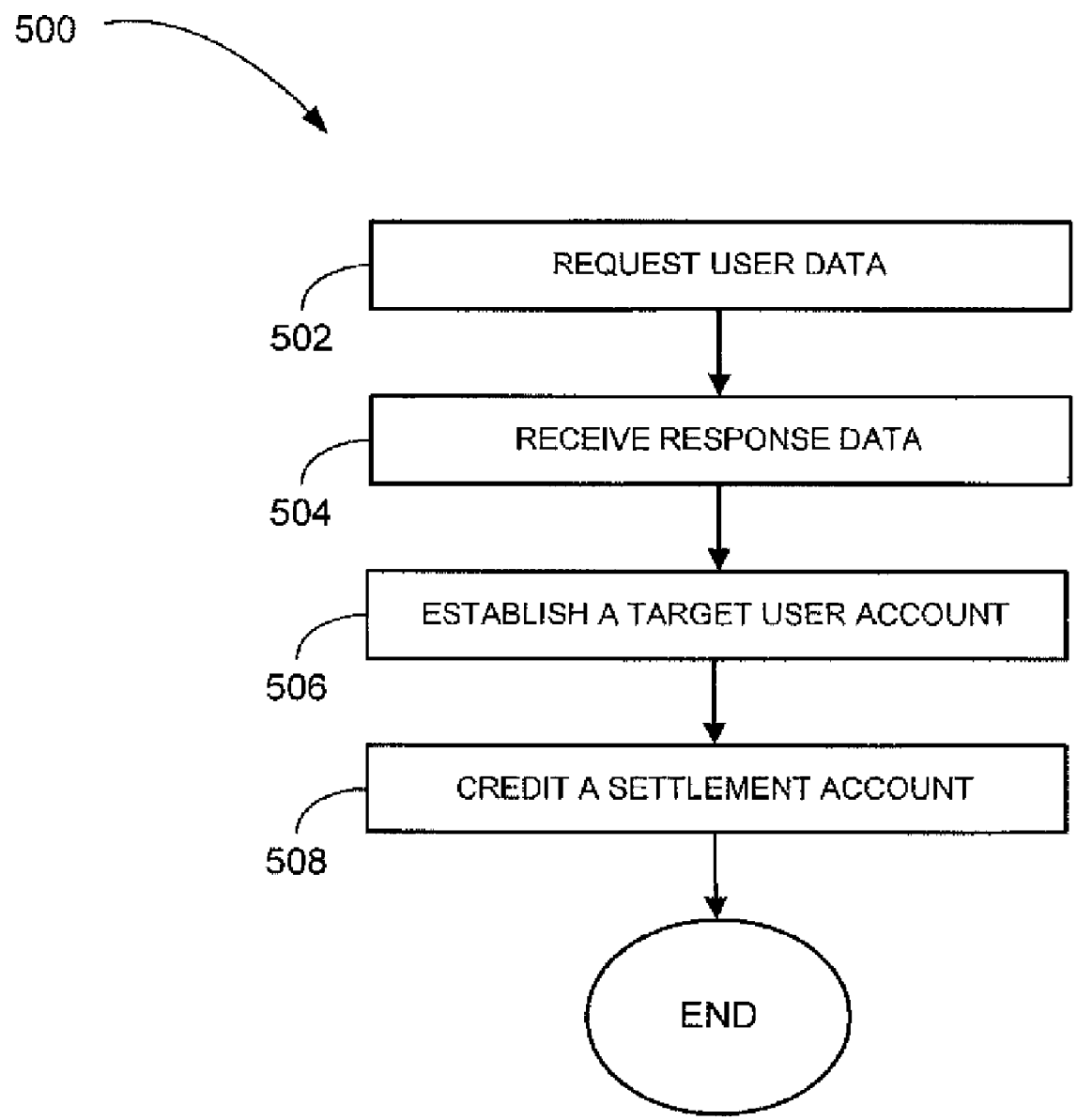
FIG. 5 is an example flowchart illustrating a method for establishing a user account according to example embodiments.

FIG. 5 illustrates a method 500 for establishing a user account according to an example embodiment. The method 500 may be performed at block 414 (see FIG. 4) or otherwise performed.

User data is requested from the user at block 502. Response data is received from the user at block 504. The target account is established with the payment processor 106 based on the response data at block 506. The settlement account associated with the value provider 102 may be credited based on the establishing of the target account at block 508.

Figure 6:
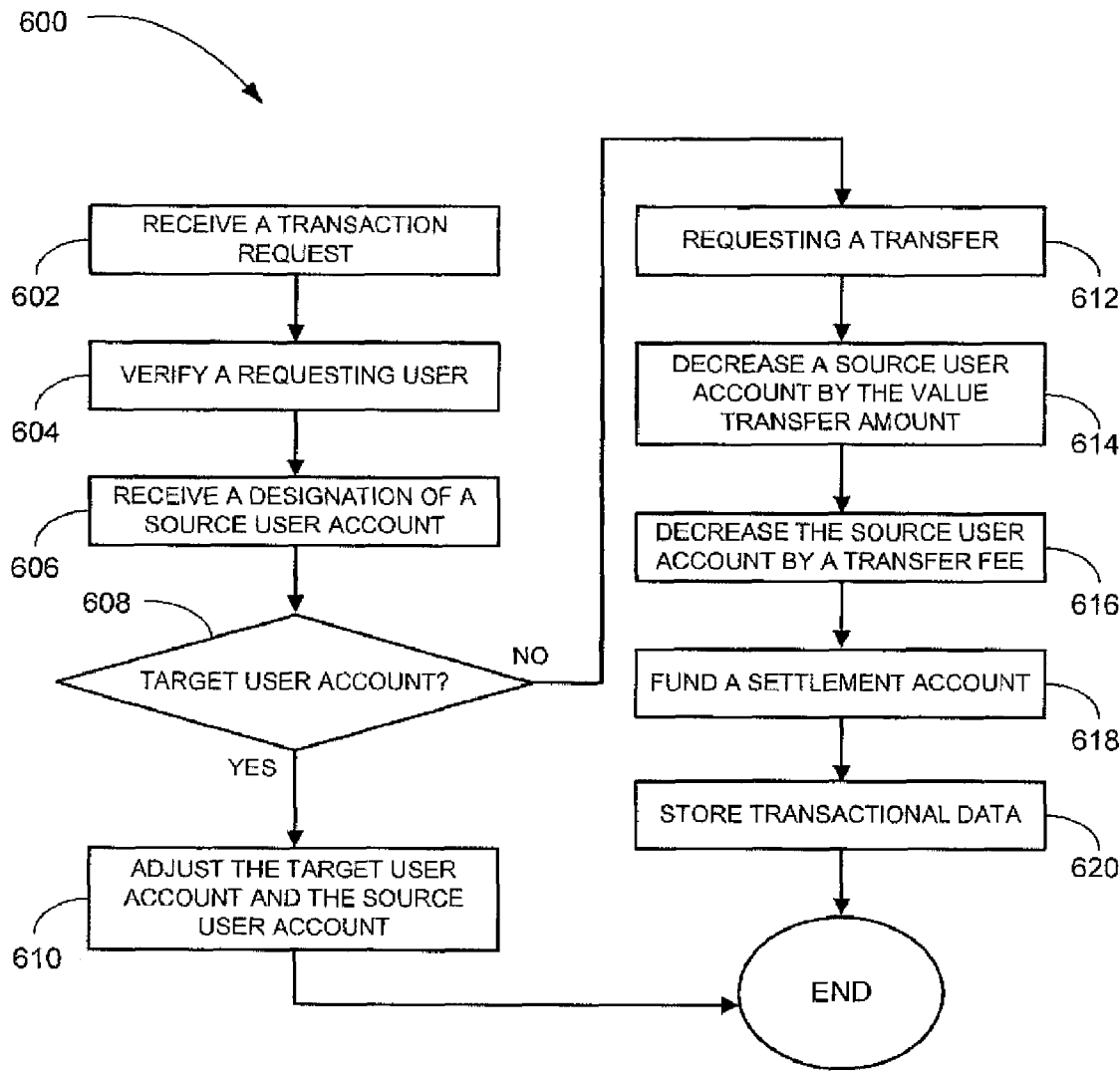
FIG. 6 is an example flowchart illustrating a method for payment processing according to example embodiments.

FIG. 6 illustrates a method 600 for payment processing according to an example embodiment. The method 600 may be performed by the value provider 102 of the system 100 (see FIG. 1) or otherwise performed.

A transaction request to transfer a value amount from a source user to a target user is received at block 602. The transaction request may include the value amount and identification of the target user. The value amount may include, by way of example, real currency, virtual currency, points, credits, miles, precious metals, or the like. Other representations of value may also be used. The transaction request may be received from a requesting user and/or a source user.

A requesting user may be verified as being authorized to provide the transaction request at block 604. A designation of the source account for the transaction request may be received at block 606.

At decision block 608, a determination may be made as to whether the target user has a target account with the value provider 102. If the target user has a target account with the value provider 102, the source account and the target account may be adjusted at block 610. If a determination is made that the target user does not have a target account with the value provider 102 at decision block 608, a request may be provided to the payment processor 106 to transfer the value amount from a settlement account to the target user. The request may include a value amount to be paid from a source user to a target user.

At block 614, a source account of the source user is decreased at the value provider 102 by the value amount. The source account of the source user may be decreased at the value provider 102 by a transfer fee at block 616.

At block 618, the settlement account is funded by at least a portion of the value amount. The funding may be equal to the value amount or may be a different amount. At block 620, the transactional data 116 may be stored (e.g., in the database 112) based on the providing of the value transfer request and the decreasing of the source account.

Figure 7:
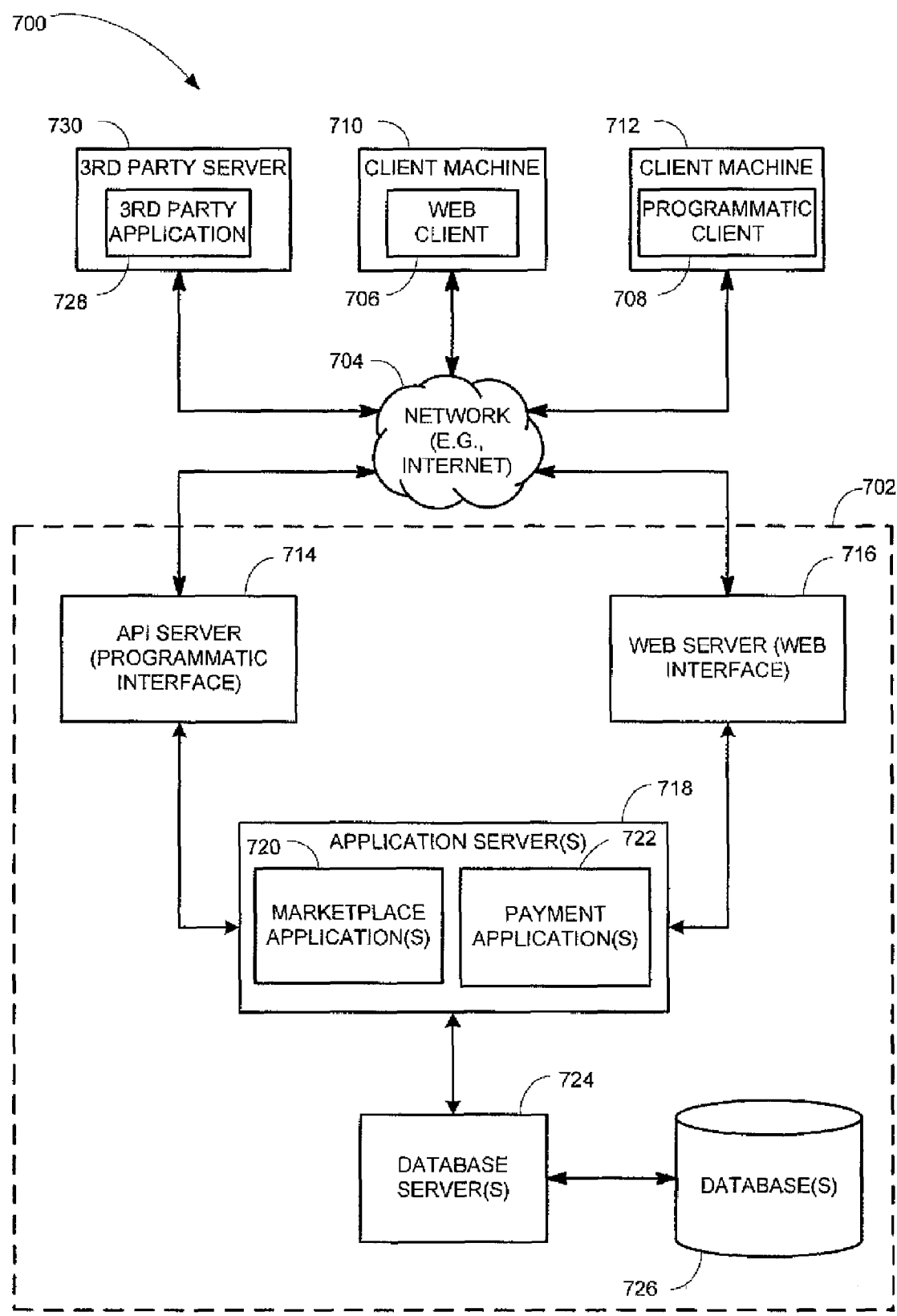
FIG. 7 is a network diagram depicting a network system, according to one embodiment, having a client server architecture configured for exchanging data over a network.

FIG. 7 is a network diagram depicting a client-server system 700, within which one example embodiment may be deployed. By way of example, a network 704 may include the functionality of the network 104, the value provider 102 and/or the payment processor 106 may be deployed within an application server 718, and the source user machine 108 and/or the target user machine 110 may include the functionality of a client machine 710 or a client machine 712. The system 700 may also be deployed in other systems.

A networked system 702, in the example forms of a network-based marketplace or publication system, provides server-side functionality, via a network 704 (e.g., the Internet or Wide Area Network (WAN)) to one or more clients. FIG. 7 illustrates, for example, a web client 706 (e.g., a browser, such as the Internet Explorer browser developed by Microsoft Corporation of Redmond, Wash. State), and a programmatic client 708 executing on respective client machines 710 and 712.

An Application Program Interface (API) server 714 and a web server 716 are coupled to, and provide programmatic and web interfaces respectively to, one or more application servers 718. The application servers 718 host one or more marketplace applications 720 and authentication providers 722. The application servers 718 are, in turn, shown to be coupled to one or more databases servers 724 that facilitate access to one or more databases 726.

The marketplace applications 720 may provide a number of marketplace functions and services to users that access the networked system 702. The authentication providers 722 may likewise provide a number of payment services and functions to users. The authentication providers 722 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 720. While the marketplace and authentication providers 720 and 722 are shown in FIG. 7 to both form part of the networked system 702, in alternative embodiments the authentication providers 722 may form part of a payment service that is separate and distinct from the networked system 702.

Further, while the system 700 shown in FIG. 7 employs a client-server architecture, embodiments of the present invention are of course not limited to such an architecture, and could equally well find application in a distributed, or peer-to-peer, architecture system, for example. The various marketplace and authentication providers 720 and 722 could also be implemented as standalone software programs, which need not have networking capabilities.

The web client 706 accesses the various marketplace and authentication providers 720 and 722 via the web interface supported by the web server 716. Similarly, the programmatic client 708 accesses the various services and functions provided by the marketplace and authentication providers 720 and 722 via the programmatic interface provided by the API server 714. The programmatic client 708 may, for example, be a seller application (e.g., the TurboLister™ application developed by eBay Inc., of San Jose, Calif.) to enable sellers to author and manage listings on the networked system 702 in an off-line manner, and to perform batch-mode communications between the programmatic client 708 and the networked system 702.

FIG. 7 also illustrates a third party application 728, executing on a third party server machine 730, as having programmatic access to the networked system 702 via the programmatic interface provided by the API server 714. For example, the third party application 728 may, utilizing information retrieved from the networked system 702, support one or more features or functions on a website hosted by the third party. The third party may, for example, provide one or more promotional, marketplace or payment functions that are supported by the relevant applications of the networked system 702.

Figure 8:
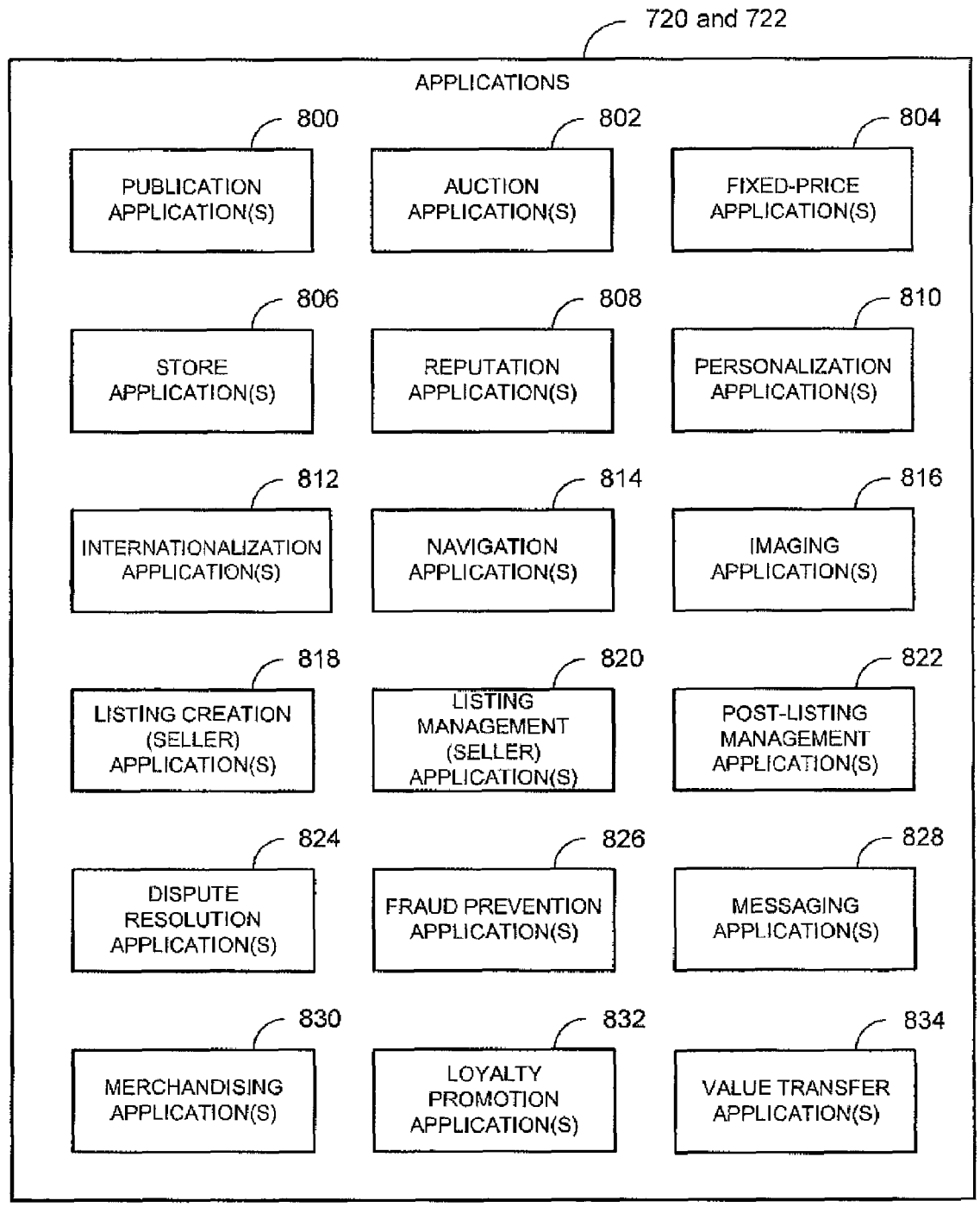
FIG. 8 is a block diagram illustrating an example embodiment of multiple network and marketplace applications, which are provided as part of the network-based marketplace.

FIG. 8 is a block diagram illustrating multiple applications 720 and 722 that, in one example embodiment, are provided as part of the networked system 702 (see FIG. 7). The applications 720 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 726 via the database servers 724.

The networked system 702 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 720 are shown to include at least one publication application 800 and one or more auction applications 802 which support auction-format listing and price setting mechanisms (e.g., English, Dutch, Vickrey, Chinese, Double, Reverse auctions etc.). The various auction applications 802 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 804 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 806 allow a seller to group listings within a "virtual" store, which may be branded and otherwise personalized by and for the seller. Such a virtual store may also offer promotions, incentives and features that are specific and personalized to a relevant seller.

Reputation applications 808 allow users that transact, utilizing the networked system 702, to establish, build and maintain reputations, which may be made available and published to potential trading partners. Consider that where, for example, the networked system 702 supports person-to-person trading, users may otherwise have no history or other reference information whereby the trustworthiness and credibility of potential trading partners may be assessed. The reputation applications 808 allow a user, for example through feedback provided by other transaction partners, to establish a reputation within the networked system 702 over time. Other potential trading partners may then reference such a reputation for the purposes of assessing credibility and trustworthiness.

Personalization applications 810 allow users of the networked system 702 to personalize various aspects of their interactions with the networked system 702. For example a user may, utilizing an appropriate personalization application 810, create a personalized reference page at which information regarding transactions to which the user is (or has been) a party may be viewed. Further, a personalization application 810 may enable a user to personalize listings and other aspects of their interactions with the networked system 702 and other parties.

The networked system 702 may support a number of marketplaces that are customized, for example, for specific geographic regions. A version of the networked system 702 may be customized for the United Kingdom, whereas another version of the networked system 702 may be customized for the United States. Each of these versions may operate as an independent marketplace, or may be customized (or internationalized and/or localized) presentations of a common underlying marketplace. The networked system 702 may accordingly include a number of internationalization applications 812 that customize information (and/or the presentation of information) by the networked system 702 according to predetermined criteria (e.g., geographic, demographic or marketplace criteria). For example, the internationalization applications 812 may be used to support the customization of information for a number of regional websites that are operated by the networked system 702 and that are accessible via respective web servers 716.

Navigation of the networked system 702 may be facilitated by one or more navigation applications 814. For example, a search application (as an example of a navigation application) may enable key word searches of listings published via the networked system 702. A browse application may allow users to browse various category, catalogue, or system inventory structures according to which listings may be classified within the networked system 702. Various other navigation applications may be provided to supplement the search and browsing applications.

In order to make listings available via the networked system 702 as visually informing and attractive as possible, the marketplace applications 720 may include one or more imaging applications 816 utilizing which users may upload images for inclusion within listings. An imaging application 816 also operates to incorporate images within viewed listings. The imaging applications 816 may also support one or more promotional features, such as image galleries that are presented to potential buyers. For example, sellers may pay an additional fee to have an image included within a gallery of images for promoted items.

Listing creation applications 818 allow sellers conveniently to author listings pertaining to goods or services that they wish to transact via the networked system 702, and listing management applications 800 allow sellers to manage such listings. Specifically, where a particular seller has authored and/or published a large number of listings, the management of such listings may present a challenge. The listing management applications 800 provide a number of features (e.g., auto-relisting, inventory level monitors, etc.) to assist the seller in managing such listings. One or more post-listing management applications 802 also assist sellers with a number of activities that typically occur post-listing. For example, upon completion of an auction facilitated by one or more auction applications 702, a seller may wish to leave feedback regarding a particular buyer. To this end, a post-listing management application 802 may provide an interface to one or more reputation applications 808, so as to allow the seller conveniently to provide feedback regarding multiple buyers to the reputation applications 808.

Dispute resolution applications 814 provide mechanisms whereby disputes arising between transacting parties may be resolved. For example, the dispute resolution applications 814 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 826 implement fraud detection and prevention mechanisms to reduce the occurrence of fraud within the networked system 702.

Messaging applications 828 are responsible for the generation and delivery of messages to users of the networked system 702, such messages for example advising users regarding the status of listings at the networked system 702 (e.g., providing "outbid" notices to bidders during an auction process or to provide promotional and merchandising information to users). Respective messaging applications 828 may utilize any one have a number of message delivery networks and platforms to deliver messages to users. For example, messaging applications 828 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 830 support various merchandising functions that are made available to sellers to enable sellers to increase sales via the networked system 702. The merchandising applications 830 also operate the various merchandising features that may be invoked by sellers, and may monitor and track the success of merchandising strategies employed by sellers.

The networked system 702 itself, or one or more parties that transact via the networked system 702, may operate loyalty programs that are supported by one or more loyalty/promotions applications 832. For example, a buyer may earn loyalty or promotions points for each transaction established and/or concluded with a particular seller, and may be offered a reward for which accumulated loyalty points can be redeemed.

One or more value transfer applications 834 may facilitate the transfer of value between one or more users of the networked system 702. The value transfer applications 834 may include the functionality of the value provider 102 and/or the payment processor 106. In an example embodiment. value may be transferred based on a sale of an item (e.g., a good or service) at a fixed or variable price by the applications 802, 804.

Figure 9:
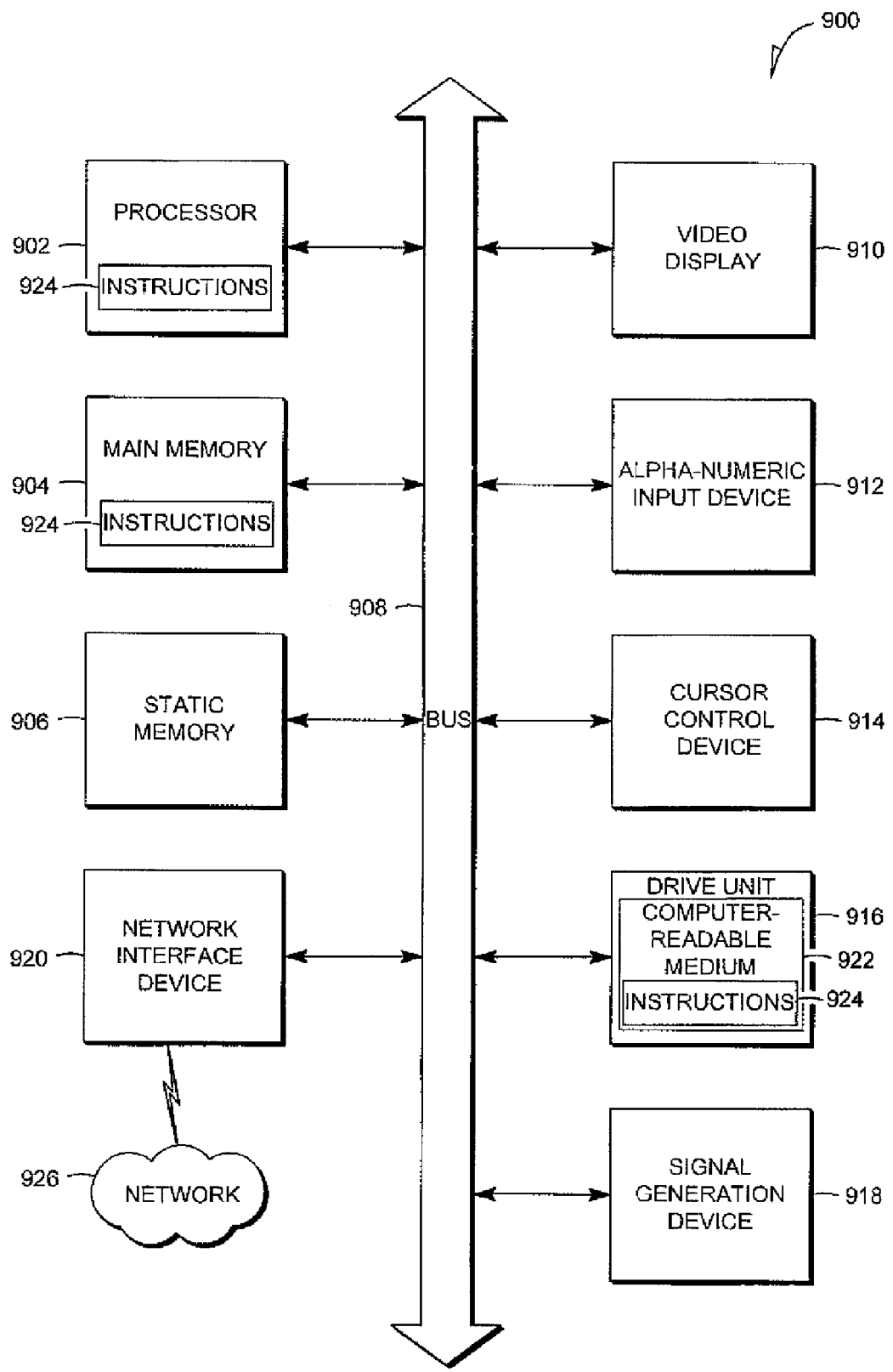
FIG. 9 is a block diagram diagrammatic representation of machine in the example form of a computer system within which a set of instructions for causing the machine to perform any one or more of the methodologies discussed herein may be executed.

FIG. 9 shows a diagrammatic representation of machine in the example form of a computer system 900 within which a set of instructions may be executed causing the machine to perform any one or more of the methods, processes, operations, or methodologies discussed herein. The value provider 102 and/or the payment processor 106 may operate on or more computer systems 900. The source user machine 108 and/or the target user machine 110 may include the functionality of one or more computer systems 900.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a drive unit 916, a signal generation device 918 (e.g., a speaker) and a network interface device 920.

The drive unit 916 includes a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for processing transfer requests have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving, by a processor of a payment provider, a value transfer request from a value provider different than the payment provider through a network, the value transfer request including a value amount to be provided from a source user to a target user, wherein the target user does not have an account with the value provider and the source user does not have an account with the payment provider;
   reducing, by the processor, a settlement account of the value provider by a first value amount corresponding to the value amount, wherein the settlement account is associated with the payment provider; and
   increasing, by the processor, a target account of the target user by a second value amount corresponding to the value amount, wherein only the value provider and the target user are required to have an account with the payment provider.

2. The method of claim 1, wherein the value provider is a bank.

3. The method of claim 1, wherein the value provider is a gaming company.

4. The method of claim 1, wherein the value amount is real currency and the first value amount is greater than or equal to the value amount.

5. The method of claim 1, wherein the value amount is virtual currency.

6. The method of claim 1, wherein the value amount comprises points, credits, miles, metals, or minutes.

7. The method of claim 1, wherein the value amount is not real currency and the second value amount is a converted value of the value amount.

8. The method of claim 1, further comprising converting the value amount from a source currency format to a target currency format.

9. A method comprising:
   receiving a transaction request to transfer a value amount from a source user to a target user, wherein the target user does not have an account with a value provider and the source user does not have an account with a payment provider different from the value provider;
   requesting, by the value provider, the payment provider to transfer the value amount from a settlement account to the target user;
   decreasing, by a processor of the value provider, a source account of the source user by a first value amount corresponding to the value amount; and
   funding, by the processor of the value provider, the settlement account by a second value amount corresponding to the value amount, wherein only the value provider and the target user are required to have an account with the payment provider.

10. The method of claim 9, wherein the value provider is a bank.

11. The method of claim 9, wherein the value provider is a gaming company.

12. The method of claim 9, wherein the value amount is real currency and the first value amount is greater than or equal to the value amount.

13. The method of claim 9, wherein the value amount is virtual currency.

14. The method of claim 9, wherein the value amount comprises points, credits, miles, metals, or minutes.

15. The method of claim 9, wherein the value amount is not real currency and the second value amount is a converted value of the value amount.

16. The method of claim 9, further comprising converting the value amount from a source currency format to a target currency format.

17. A system, comprising:
   a computer storage storing account information for a plurality of users having an account with a payment provider, wherein the account information comprises a user account identifier; and
   a processor operable to:
      receive a value transfer request from a value provider different than the payment provider through a network, the value transfer request including a value amount to be provided from a source user to a target user, wherein the target user does not have an account with the value provider and the source user does not have an account with the payment provider;
      create an account for the target user if the target user does not have an account with the payment provider based on the stored account information;
      reduce a settlement account of the value provider by a first value amount corresponding to the value amount, wherein the settlement account is associated with the payment provider; and
      increase a target account of the target user by a second value amount corresponding to the value amount, wherein only the value provider and the target user are required to have an account with the payment provider.

18. The system of claim 17, wherein the value provider is a bank.

19. The system of claim 17, wherein the value provider is a gaming company.

20. The system of claim 17, wherein the value amount is real currency and the first value amount is greater than or equal to the value amount.

21. The system of claim 17, wherein the value amount is virtual currency.

22. The system of claim 17, wherein the value amount comprises points, credits, miles, metals, or minutes.

23. The system of claim 17, wherein the value amount is not real currency and the second value amount is a converted value of the value amount.

24. The system of claim 17, wherein the processor is further operable to convert the value amount from a source currency format to a target currency format.

* * * * *